US005644758A

United States Patent [19]

Patrick et al.

[11] Patent Number: 5,644,758

[45] Date of Patent: Jul. 1, 1997

[54] BITMAP BLOCK TRANSFER IMAGE CONVERSION

[75] Inventors: Stuart Raymond Patrick, Issaquah; Amit Chatterjee, Redmond, both of Wash.

[73] Assignee: Microsoft Corporation, Redmond, Wash.

[21] Appl. No.: 354,926

[22] Filed: Dec. 13, 1994

[51] Int. Cl.[6] .................... G06F 13/00

[52] U.S. Cl. .................... 395/525; 345/189

[58] Field of Search .................... 395/162–166, 395/133–135, 137, 138, 501, 523, 525, 507, 515, 509; 345/27, 121, 127, 132, 133, 185, 189

[56] References Cited

U.S. PATENT DOCUMENTS 4,933,878 6/1990 Guttag et al. .................... 395/164

5,532,716 7/1996 Sano .................... 345/132

OTHER PUBLICATIONS

Programming Quickies "Fast Line–Drawing Technique" by Mike Higgins, pp. 414–416.

"Device Driver Adaption Guide" Microsoft Corporation, 1992; Chapters 1, 2 & 10.

*Primary Examiner*—Kee M. Tung

*Attorney, Agent, or Firm*—Klarquist Sparkman Campbell Leigh & Whinston, LLP

[57] ABSTRACT

The speed of bitmap block transfers involving image transformations between source and destination bitmaps is increased by forming a mapping array with entries corresponding one-to-one to elements of destination bitmap scan lines. A preprocessor fills the entries of the mapping array with indices of elements in a source scan line that map according to the image transformation to the elements of a destination scan line that correspond with the array entries. A block transfer compiler can then generate code to perform the transfer which uses the mapping array in an indexed look-up operation to determine the source element to transfer to each element of each scan line of the destination bitmap.

16 Claims, 8 Drawing Sheets

BITMAP BLOCK TRANSFER IMAGE CONVERSION

FIELD OF THE INVENTION

This invention relates generally to computer graphics. More particularly, this invention relates to a method and apparatus for efficiently performing an image conversion while transferring a block of data from a source location in computer memory to a destination location.

BACKGROUND OF THE INVENTION

In the field of computer graphics, pictorial information is often stored as a bitmap, in which each pixel of an image corresponds to 1 or more bits in the bitmap. Monochrome bitmaps require only 1 bit per pixel (or "bpp"); color bitmaps require additional bits to indicate the color of each pixel. Typically, color pixels are represented by 4, 8, 16, or 24 bits per pixel.

Often all or part of a bitmap must be moved from one location in a computer's memory (the "source" location) to another location (the "destination" location). Transfers of this type are called bitmap block transfers, or "blt"s for short, and are typically carried out by a computer's operating system in response to a function call from an application program. For example, an application program may have "drawn" a figure on a bitmap in a source memory location by changing the numeric values of the bits in the bitmap. To display the figure rapidly on the screen of a display device, the bitmap is block transferred (or "blitted") from the source memory location to the video display (destination) memory location. A display device associated with the video display memory then displays the bitmap containing the figure. The video display memory is also commonly referred to as the screen memory or frame buffer for the display device.

Often there is a need to change a bitmap as it is transferred from the source to the destination in memory. These changes might be required for a number of reasons. First, the source and destination may have different color formats for their bitmaps. For example, a bitmap in the source may represent color information with red, green and blue intensities in color components per pixel, in that order. A bitmap in the destination, meanwhile, may require these color components to be in a different order, such as blue, green and then red. In such a case, the order of the color information must be altered to match the order in which color information is represented in the destination during the block transfer. (This change in format is referred to as a "color model conversion").

Second, the bitmaps of the source and destination might be different sizes. For example, the source's bitmap may have rectangular dimensions of 10×10 pixels, but an application program might want the bitmap transferred to the video display memory location and displayed with dimensions of 20×20 pixels. Accommodating this change in size can also be done during the block transfer. (This operation is referred to as "stretching").

Third, a portion of the source's bitmap, with or without a change in size, may be fit into a smaller rectangular area of the destination's bitmap. For example, a portion of a 300×450 pixel bitmap in the source may be fit into a 70×120 pixel area of the destination's bitmap. To accomplish this change, the border areas of the source bitmap may be omitted. (This operation is referred to as "clipping," and is particularly useful in a graphical user interface where a large bitmap can be scrolled through a smaller window or where a bitmap is transferred into a window which is overlapped by another window.)

These block transfers of data between memory locations should be as fast as possible, since they occur frequently and involve the movement of large amounts of data. For example, in the process of opening different windows in a graphical user interface, many data blocks are transferred into the display memory to produce the windows' color, text and graphics. Therefore the slower the rate of transfer, the slower the rate at which the computer system operates. When an image transformation also is included with a block transfer, the transfer rate can be particularly slow.

Prior approaches for data block transfers with image transformations have been inefficient. In a typical prior approach, the image transformation is processed separately for each byte or pixel to be transferred into the destination bitmap. (A byte is a group of bits such as 8, and is normally the smallest addressable segment of data in a memory.) For example, the block transfer may be implemented in code that embeds a byte transfer operation within a loop, so that the byte transfer operation is repeated once for each byte of the data block to be transferred. To also perform an image transformation with the block transfer, an operation which determines the transform also is included in the loop and repeated for each byte transferred. As data block transfers typically involve thousands of bytes, repeating the transform operation for each byte can significantly decrease the data block transfer's rate.

Accordingly, an object of this invention is to perform data block transfers which include image transformations more rapidly than before. Another object of the invention is to reduce the time required for processing the image transformation during a data block transfer.

SUMMARY OF THE INVENTION

In accordance with the invention, a method and apparatus for block transferring data from a source bitmap to a destination bitmap in memory is shown and described. The preferred embodiment of the invention utilizes a mapping data structure to effect an image transformation during the block transfer. The mapping data structure contains a plurality of indices, one for each element of a scan line of the destination bitmap. Each of the indices indicates an element in a scan line of the source bitmap which corresponds to the respective element of the destination bitmap scan line according to the image transformation. The mapping data structure is generated once prior to each block transfer. During the block transfer, the mapping data structure is used in an indexed look-up operation to locate elements of the source image bitmap to be transferred to each destination image bitmap element.

The invention provides the benefit of more rapid block transfers involving image transformations. According to the invention, the processing of an image transformation is performed when generating the mapping data structure. Accordingly, the image transformation need not be repeated when transferring data to each scan line of the destination image bitmap. The invention therefore reduces the time spent processing an image transformation during a block transfer. In block transfers according to the invention, corresponding elements of a source bitmap scan line are transferred to each destination bitmap scan line through an indexed look-up using the indices of the mapping data structure. Such indexed look-up operations can generally be performed faster than transfer operations which also include processing of an image transformation.

In the preferred embodiment of the invention, the mapping data structure is utilized to effect stretching and clipping transformations, as well as color model conversions which alter the order of color elements in a pixel.

The foregoing and other objects, features, and advantages of the invention will become more apparent from the following detailed description of a preferred embodiment which proceeds with reference to the accompanying drawings.

DETAILED DESCRIPTION OF PREFERRED EMBODIMENTS

Figure 1:
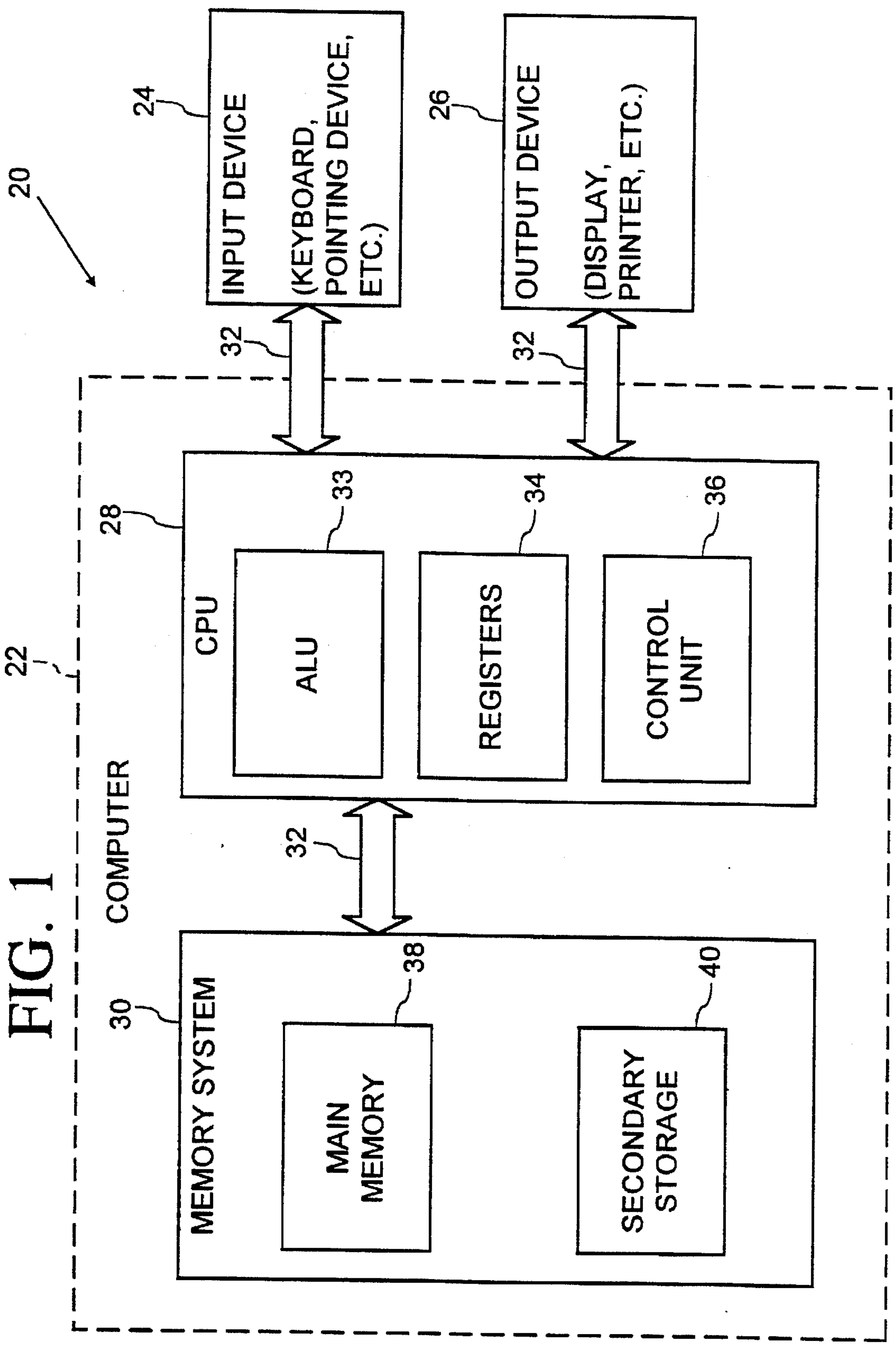
FIG. 1 is a block diagram of a computer system that may be used to implement a method and apparatus embodying the invention for transferring a data block from a source to a destination in memory.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

It should be understood that FIG. 1 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
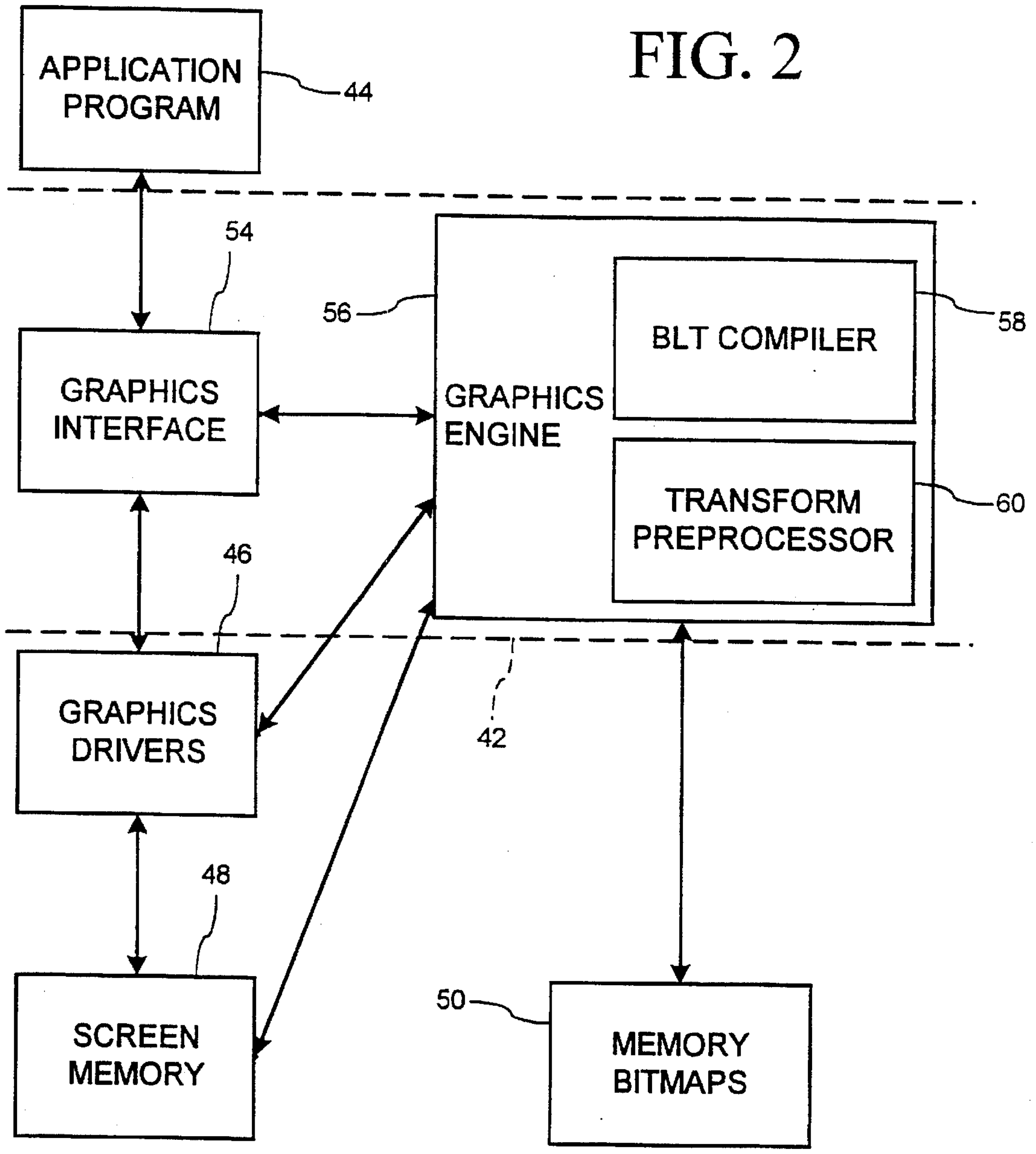
FIG. 2 is a block diagram of an application program, operating system, graphics drivers and memory within a computer system such as shown in FIG. 1.

FIG. 2 is a block diagram of a portion of an operating system 42 in communication with an application program 44 and a graphics driver 46. Operating system 42 further communicates with screen memory 48 and bitmaps 50 or other memory locations that may serve as sources and destinations in memory for a data block of bytes. Within the illustrated portion of operating system 42 are a graphics interface 54 and a graphics engine 56. Each of the blocks in FIG. 2 except for the memory is typically implemented as a module of code for a set of related functions.

In the process of transferring a data block from a source to a destination in memory, application program 44 calls a blt function in graphics interface 54, passing as parameters the location of the source and destination, the size in pixels of the data block to be transferred and a raster operation code (ROP) for logically combining the bits in the source and destination. Graphics interface 54, in turn, calls an appropriate function in graphics driver 46 which, in turn, calls an appropriate function in a graphics engine 56. Graphics engine 56 contains, among other things, a blt compiler 58 and an image transform preprocessor 60 embodying the invention. Using compiler 58 and preprocessor 60 in response to a call to a blt function, graphics engine 56 carries out the data block transfer including an image transformation from the source to the destination in memory and notifies graphics interface 54 to this effect.

This, of course, is only a description of the preferred embodiment. The blt compiler 58 and preprocessor 60 may also be contained in the graphics interface, graphics drivers, an application program or suitably elsewhere in the computer system 20.

The present invention employs preprocessor 60 for more rapidly transferring a data block including an image transformation by graphics engine 56 from a source to a destination in memory. The rate of transfer by graphics engine 56 is increased by processing a desired image transformation prior to the block transfer operation using transform preprocessor 60. Transform preprocessor 60 processes the desired image transformation from elements in a source scan line to elements of a destination scan line, and generates a mapping data structure (described below) containing indices to elements of the source scan line for each element of the destination scan line. The mapping data structure is used by graphics engine 56 in transferring elements to each destination scan line from corresponding source scan lines using indexed look-up operations. Since the image transformation is processed for a single representative destination scan line when generating the mapping data structure, the block transfer can be performed more rapidly than previous block transfers which repeat the image transformation processing for each destination scan line.

Figure 3:
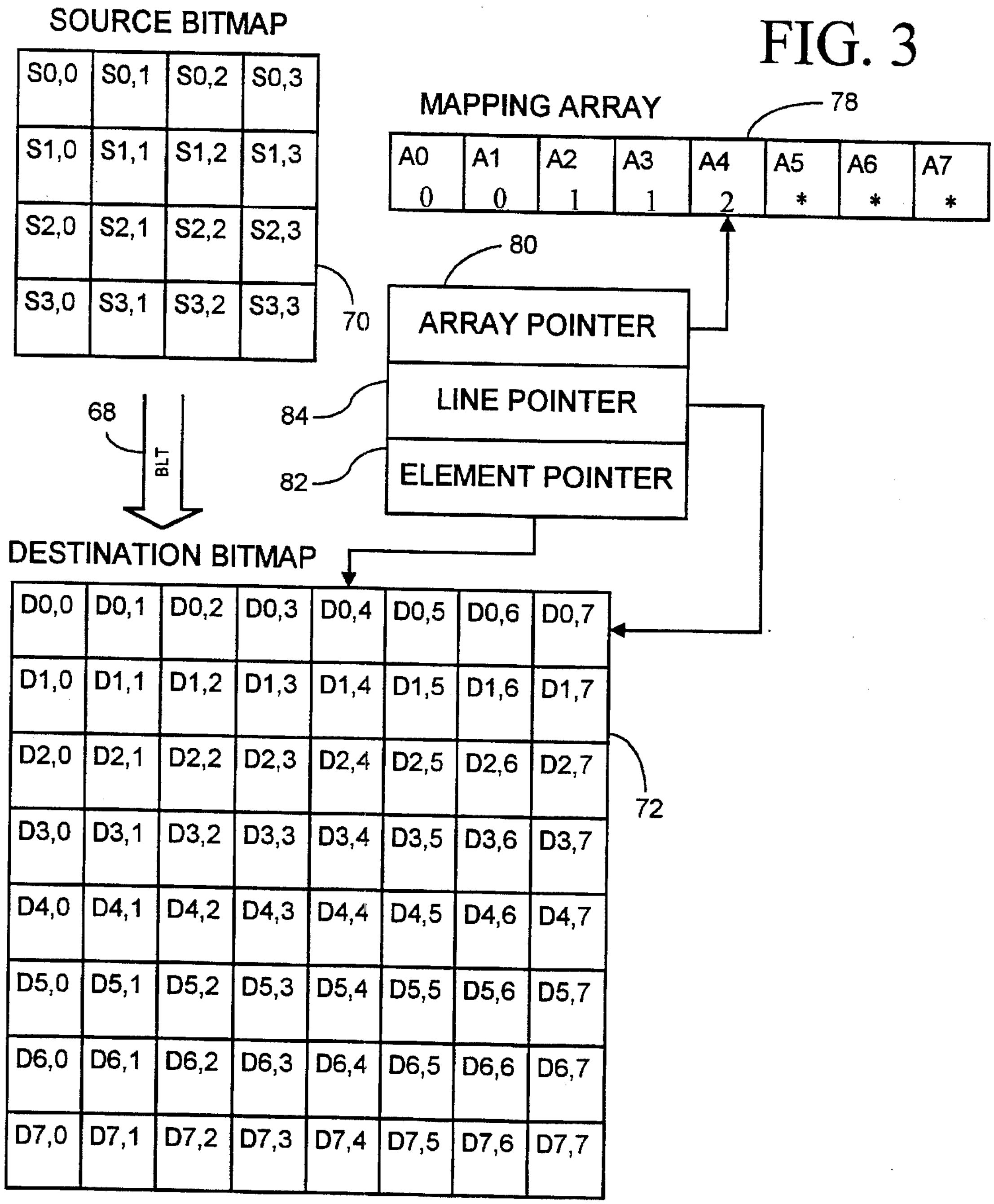
FIG. 3 is a diagram illustrating a bitmap block transfer including an integer stretch transformation from a source to a destination memory involving use of a mapping array formed according to a preferred embodiment of the invention.

FIG. 3 shows an exemplary block transfer 68 involving a 1:2 integer stretch transformation between a source bitmap 70 and a destination bitmap 72 by graphics engine 56 of the preferred embodiment. In block transfer 68, source bitmap 70 is 4×4 pixels in size (16 pixels total). Destination bitmap 72, however, is 8×8 pixels in size (64 pixels total). So that the image represented by source bitmap 70 fills the entire destination bitmap 72, the source bitmap 70 is "stretched" in both horizontal and vertical dimensions using a 1:2 integer stretch transformation when transferred to destination bitmap 72. Since the 1:2 stretch transformation in this example is performed in both horizontal and vertical dimensions, each pixel of the source bitmap is mapped by the transformation to a 2×2 pixel area of destination bitmap 72. For example, a pixel ($S_{0,0}$) in the top left corner of source bitmap 70 is transferred to each pixel in a 2×2 pixel area ($D_{0,0}$, $D_{0,1}$, $D_{1,0}$, and $D_{1,1}$) at the top left corner of destination bitmap 72. (The principles of the invention can be easily extrapolated to transfers in which a stretch transformation is performed in only one dimension, or different stretch ratios are used in the horizontal and vertical dimensions.)

In the exemplary block transfer 68, destination bitmap 72 is filled with pixels from source bitmap 70 starting from the top left pixel ($D_{0,0}$) of destination bitmap 72. Block transfer 68 next proceeds to fill destination bitmap 72 pixel-by-pixel from left to right across a top horizontal scan line ($D_{0,0}$–$D_{0,7}$). Block transfer 68 then fills each horizontal scan line of destination bitmap 72 from top to bottom in a like manner. Each horizontal scan line of destination bitmap 72 preferably comprises a set of consecutively addressed memory locations. Each pixel of a scan line may comprise one or more of the consecutive memory locations. For example, if color information is represented with 24-bits per pixel, then each pixel in the bitmap may comprise 3 addressable bytes (in a computer in which each addressable byte stores 8-bits).

To more rapidly perform block transfer 68, preprocessor 60 (FIG. 2) processes the horizontal 1:2 stretch transformation (i.e. determines the mapping of pixels in destination bitmap 72 from pixels of source bitmap 70) in generating a mapping array 78 prior to block transfer 68. In the illustrated example, mapping array 78 has a plurality of entries $A_0$–$A_7$ equal in number to the number of pixels per horizontal scan line of destination bitmap 72 (i.e. 8 pixels). In these entries of mapping array 78, preprocessor 60 stores indices to pixels in a horizontal scan line of source bitmap 70 in the order in which the pixels are to be transferred to horizontal scan lines of destination bitmap 72 according to the 1:2 stretch transformation. In the exemplary block transfer 68, the indices preferably are an offset in pixels from an address of a first pixel on the scan line. Thus, for the 1:2 stretch transformation of the exemplary block transfer 68, the indices 0, 0, 1, 1, 2, 2, 3, and 3 are stored in the mapping array. (FIG. 3 illustrates mapping array 78 partially filled with these indices.) These indices indicate which pixels of a corresponding scan line of source bitmap 70 are to be transferred to each horizontal scan line of destination bitmap 72. For example, for horizontal scan line $D_{0,0}$–$D_{0,7}$ of destination bitmap 72, the following pixels of the corresponding scan line of source bitmap 70 are transferred: $S_{0,0}$, $S_{0,0}$, $S_{0,1}$, $S_{0,1}$, $S_{0,2}$, $S_{0,2}$, $S_{0,3}$, and $S_{0,3}$.

Figure 4:
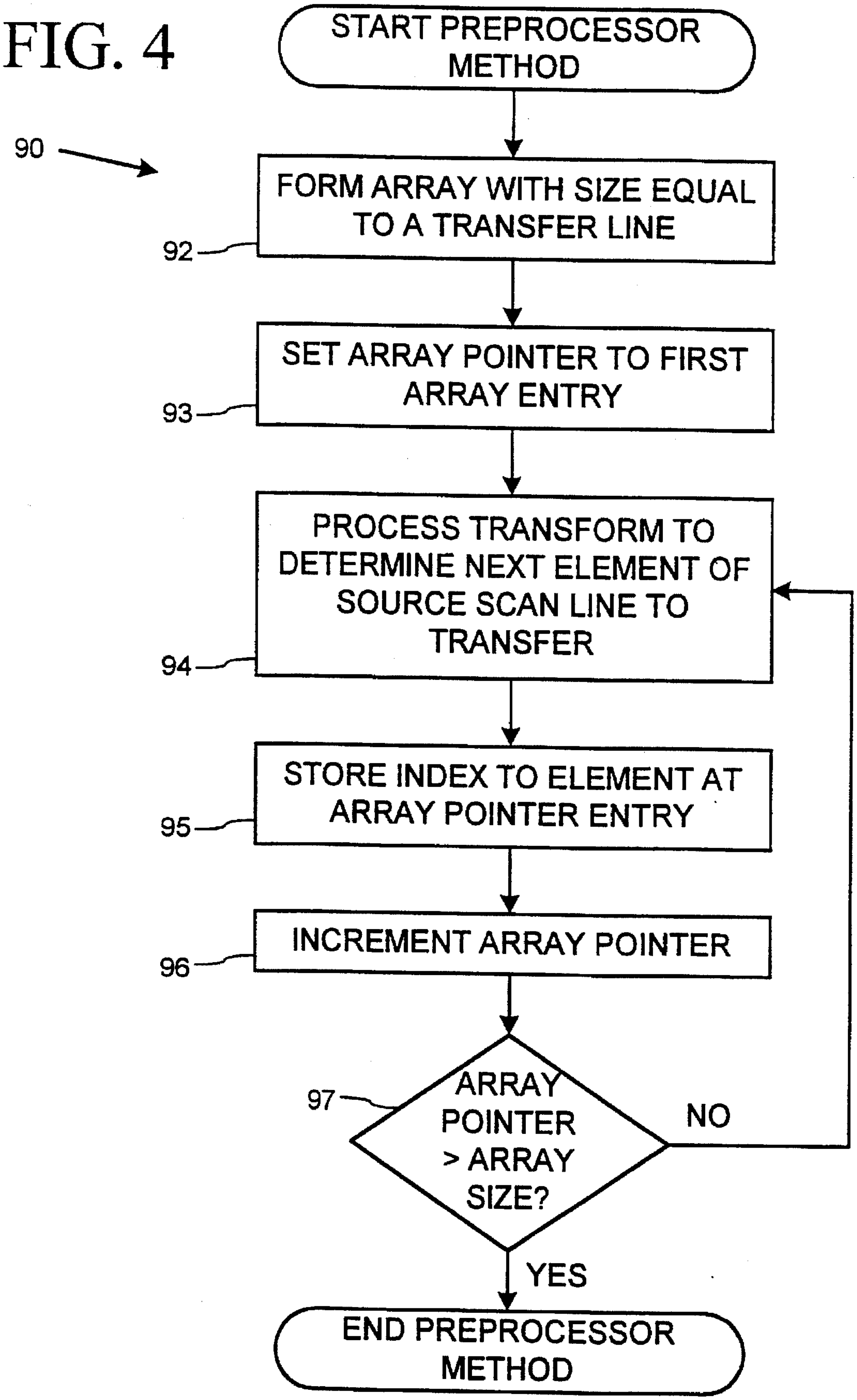
FIG. 4 is a flow chart of a method for generating a mapping array for use in a bitmap block transfer including an image transformation according to the preferred embodiment of the invention.

FIG. 4 shows a method 90 according to the preferred embodiment of the invention by which preprocessor 60 (FIG. 2) generates a mapping array for a particular block transfer and image transformation, such as mapping array 78 for exemplary 1:2 stretch transform block transfer 68 of FIG. 3. At an initial step 92 of method 90, preprocessor 60 forms an array data structure having a number of entries equal to a number of discrete elements (i.e. pixel, color component, or like element) per scan line of a destination bitmap for use as the mapping array of the block transfer. In block transfer 68 of FIG. 3 (which has eight pixels per scan line of destination bitmap 72) for example, preprocessor 60 forms mapping array 78 having eight entries. Generally, the discrete elements of a transfer are pixels. Alternatively, as in the block transfer involving a color conversion illustrated in FIG. 7 and described below, the discrete elements are color components of pixels. However, the discrete elements can be any like separate component of a pixel or scan line of a destination bitmap. The array data structure preferably is formed by allocating a portion of the main memory 38 (FIG. 1) as the mapping array. The preprocessor preferably allocates consecutively addressed locations of memory 38 for the mapping array.

At a next step 93 of method 90, preprocessor 60 sets an array pointer to indicate a first entry of the mapping array. In block transfer 68 of FIG. 3, for example, an array pointer 80 is set to indicate entry $A_0$ of mapping array 78 at step 93. In the preferred embodiment, one of the registers 34 (FIG. 1) in the computer's CPU 28 operates as the array pointer by storing an address of an entry of the mapping array in the main memory 38. Alternatively, a location in the main memory or like data storage may operate as the array pointer.

Then, in steps 94–97, preprocessor 60 proceeds to fill the mapping array with indices to elements of a source scan line which map according to the image transformation of the block transfer to each element in order of a destination scan line. At step 94, preprocessor 60 processes the image transformation to determine which element of a source scan line is next in order to be transferred. The index to that element is then stored in the mapping array entry indicated by the array pointer at step 95. At step 96, the array pointer is incremented to indicate the next entry of the mapping array. At step 97, preprocessor 60 repeats this loop of steps 94–97 until the array pointer is incremented past the last entry of the mapping array. Whereupon, method 90 ends.

In block transfer 68 illustrated in FIG. 3 for example, array pointer 80 is first set to indicate entry $A_0$ of mapping array 78 at step 93 of method 90. At step 94, preprocessor 60 processes the 1:2 stretch transformation to determine the pixel of a source scan line which would first be transferred to a destination scan line. In this exemplary block transfer 68, the leftmost pixel of any source scan line would be first in order of transfer. Accordingly, at step 95, an index to the leftmost pixel in a source scan line (i.e. an offset of zero) is stored in mapping array 78. Array pointer 80 is then incremented to the next entry $A_1$ at step 96, and the steps 94–97 repeated. In this next iteration of the loop, the next pixel in order of transfer is still the leftmost pixel of any source scan line, so an index to that pixel (offset equal to zero) is stored in that next entry $A_1$ of mapping array 78. This sequence of steps 94–97 continues for each of the entries $A_0$ through $A_8$ of mapping array 78. (FIG. 3 illustrates the exemplary block transfer 68 with method 90 partially complete, i.e. with entries $A_0$ through $A_4$ filled with appropriate indices.)

Figure 5:
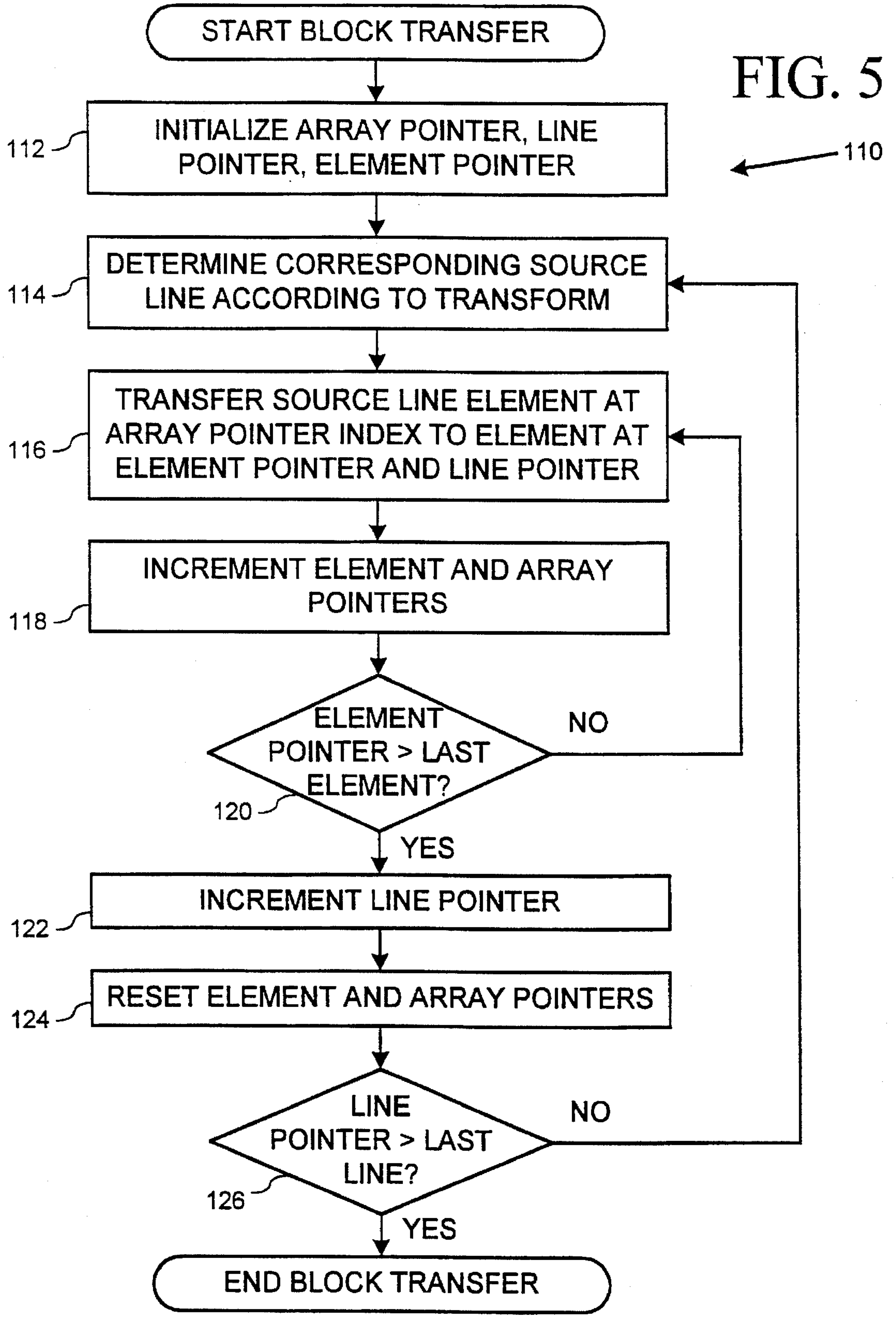
FIG. 5 is a flow chart of a method for performing a bitmap block transfer including an image transformation according to the preferred embodiment of the invention and involving use of the mapping array formed by the method of FIG. 4.

Referring now to FIG. 5, block transfers with image transformations in the preferred embodiment are performed according to a method 110. To implement method 110 in the preferred embodiment, blt compiler 58 produces code for execution by graphics engine 56 which is optimized for a particular block transfer. Block transfer method 110 utilizes the mapping array which is generated by preprocessor 60 (FIG. 2) using method 90 (FIG. 4) to transform a bitmap being transferred from a source to a destination within the computer system 20 (FIG. 1). Block transfer method 110 preferably transfers a bitmap element-by-element from left-to-right across each horizontal scan line of the destination bitmap, and scan line-by-scan line from top-to-bottom of the destination bitmap. As each element is transferred, the mapping array is used in an indexed look-up to determine which element of the source to transfer to the respective element of the destination bitmap.

At a first step 112 of method 110, an array pointer is initialized to indicate a first element of the mapping array. An element pointer and a line pointer also are initialized at step 112 to indicate a first element and a first scan line, respectively, of a destination bitmap. In the exemplary 1:2 stretch transform block transfer 68 of FIG. 3 for example, array pointer 80 is initialized to indicate entry $A_0$ of mapping array 78. Further, a line pointer 84 is initially set to indicate a topmost scan line $D_{0,0}$–$D_{0,7}$ of destination bitmap 72, and an element pointer 82 is initialized to indicate a leftmost pixel $D_{0,0}$ of the topmost scan line. In the preferred embodiment, two of the registers 34 (FIG. 1) in the computer's CPU 28 operate as line pointer 84 and element pointer 82. Line pointer 84 preferably indicates a scan line by storing the scan line's address in main memory 38. Element pointer 82 preferably indicates an element from the scan line indicated by line pointer 84 by storing an offset of the element from the scan line's address. Alternatively, locations in main memory 38 or like data storage may operate as the element and line pointers.

At a next step 114, the image transformation is again processed to determine which source scan line is to be mapped to the destination scan line currently indicated by the line pointer. In the exemplary 1:2 stretch transform block transfer 68 shown in FIG. 3 for example, each scan line of source bitmap 70 is mapped to two scan lines of destination bitmap 72. More specifically, a topmost scan line $S_{0,0}$–$S_{0,4}$ is mapped to each of the destination scan lines $D_{0,0}$–$D_{0,7}$ and $D_{1,0}$–$D_{1,7}$. A second scan line $S_{1,0}$–$S_{1,4}$ is mapped to each of the destination scan lines $D_{2,0}$–$D_{2,7}$ and $D_{3,0}$–$D_{3,7}$. Third and fourth source scan lines are likewise mapped to fifth through eighth destination scan lines. Accordingly, when line pointer 84 indicates destination scan line $D_{0,0}$–$D_{0,7}$, the corresponding source scan line is $S_{0,0}$–$S_{0,4}$.

In steps 116, 118, and 120, the destination scan line indicated by the line pointer is filled element-by-element with elements indexed through the mapping array from the corresponding source scan line. More specifically at step 116, an indexed look-up operation is performed using the mapping array to determine which element of the corresponding source scan line is to be transferred to the element of the destination scan line currently indicated by the line and element pointers. The indexed look-up operation locates the source element to be transferred by reading the index in the entry of the mapping array currently indicated by the array pointer. The index read from the mapping array is preferably added to the address of the corresponding source scan line to find the element to be transferred. Then at step 118, the element and array pointers are both incremented to indicate the next element and array entry, respectively. At step 120, the element pointer is checked to determine whether the steps have already been repeated for each element of the current destination scan line. If not, the steps 116, 118, and 120 are repeated again. When the steps have been repeated for each element of the destination scan line, the element pointer will be incremented past the last element of the destination scan line. Method 110 then proceeds at step 122.

In the exemplary 1:2 stretch transform block transfer 68 shown in FIG. 3 for example, array pointer 80, line pointer 84, and element pointer 82 initially indicate entry $A_0$, element $D_{0,0}$, and scan line $D_{0,0}$–$D_{0,7}$, respectively. At step 116 in method 90 with these initial pointer settings, the index in entry $A_0$ indicated by array pointer 80 is read and added to the address of the source scan line $S_{0,0}$–$S_{0,4}$ which corresponds to the destination scan line $D_{0,0}$–$D_{0,7}$ indicated by line pointer 84. The sum of the index and source scan line address in the preferred embodiment is the address of the pixel $S_{0,0}$ which is transferred to the element $D_{0,0}$ indicated by the element pointer. As steps 116, 118, and 120 are repeated, a like indexed look-up and transfer of a source bitmap pixel is performed for each pixel of the destination scan line $D_{0,0}$–$D_{0,7}$ currently indicated by line pointer 84. For example, when the array and element pointers have been incremented until they indicate entry $A_4$ and pixel $D_{0,4}$ as shown in FIG. 3, the indexed look-up operation locates pixel $S_{0,2}$ for transfer to the pixel $D_{0,4}$.

Next, at steps 122, 124, and 126 of block transfer method 110, the operations of steps 114, 116, 118 and 120 are repeated for the remaining scan lines of the destination bitmap. More specifically, the line pointer is incremented at step 122 to indicate the next scan line of the destination bitmap, such as by adding a length of bytes per scan line to the contents of the line pointer. The line pointer in the preferred embodiment then contains an address of the next destination scan line. At step 124, the element pointer is reset to indicate a first element of the scan line currently indicated by the line pointer, such as by setting the element pointer to an offset of zero. The array pointer also is reset to indicate a first entry of the mapping array. At step 126, the line pointer is checked to determine whether steps 114–124 have already been repeated for all scan lines. If not, steps 114–124 are again repeated for the new pointer settings. When the steps have been repeated for all scan lines of the destination bitmap, block transfer method 110 is completed.

The use of the mapping array in block transfer method 110 eliminates any processing of the horizontal transformation from the inner loop (steps 116, 118 and 120) of block transfer method 110. The horizontal transformation is processed only in preprocessor method 90 to determine the indexes stored into the mapping array. These same indexes are then used for each scan line transferred by block transfer method 110. Accordingly, the horizontal transformation is, in effect, processed for only one representative destination scan line instead of for all destination scan lines involved in the block transfer.

The processing of the horizontal transformation by preprocessor 60 (FIG. 2) also speeds up block transfers by simplifying the generation by compiler 58 (FIG. 2) of code implementing block transfer method 110. Compiler 58 need only generate code to perform the indexed look-up operation with the mapping array in the inner loop (steps 116, 118 and 120) of block transfer method 110, and not code for processing the horizontal transformation.

In the preferred embodiment, the mapping array is used only for the horizontal transformation involved in a block transfer, and not for any vertical transformation. This is because the same horizontal transformation is applied to the elements of each scan line in the transfer, and is therefore repeated multiple times in the transfer. The vertical transformation, however, is applied to the single set of scan lines in a bitmap, and therefore not repeated for multiple sets in the transfer. In situations where the horizontal and vertical transformations are identical, some alternative embodiments of the invention may apply the mapping array formed for the horizontal transformation to also effect the vertical transformation.

Referring again to FIGS. 3 and 4, for block transfers involving integer stretch transforms, the processing of the horizontal transformation at step 94 to generate the indices stored in the mapping array is straightforward. The term integer stretch transform is used herein to refer to stretch transformations where the ratio of destination scan line elements to source scan line elements is an integer number (i.e. a ratio of 1:n where n is an integer). The term also is used herein to refer to stretch transformations where the ratio is n:1 which results in compression of the source image into a smaller destination bitmap.

In the case of integer stretch transformations with ratios of 1:n, an index of zero is stored in the first n entries of the mapping array. The index is then incremented and stored in the next n entries of the mapping array. The incrementing of the index and storing in the next n entries is then repeated until the mapping array is filled.

For integer stretch transformation with ratios of n:1, the index stored in each entry of the mapping array is given by the following equation:

$$A_i = i \times 9n \tag{1}$$

Where $A_i$ are the entries of the mapping array (e.g. entries $A_0$–$A_7$ of mapping array 78 in FIG. 3).

Figure 6:
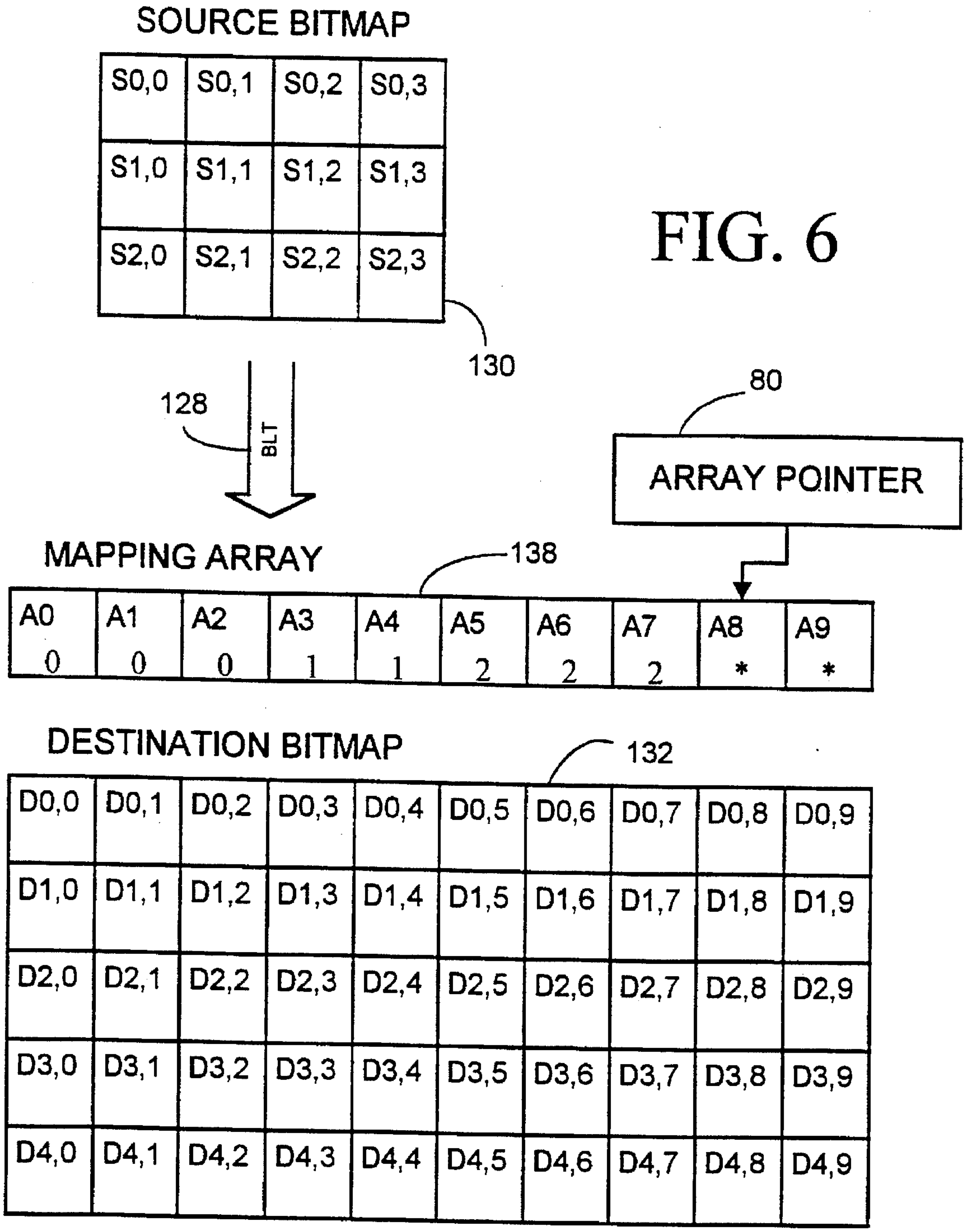
FIG. 6 is a diagram illustrating a block transfer including a non-integer stretch transformation from a source bitmap to a destination bitmap using the methods shown in FIGS. 4 and 5.

FIG. 6 shows an exemplary block transfer 128 involving a non-integer stretch transformation. Non-integer stretch transformations have a non-integer ratio of source elements to destination elements. In block transfer 128 for example, a 4×3 pixel source bitmap 130 is mapped onto a 10×5 pixel destination bitmap 132 by a 2:5 horizontal stretch transformation and a 3:5 vertical stretch transformation. To form a mapping array 138 for block transfer 128, preprocessor 60 processes the 2:5 horizontal stretch transformation at step 94 of preprocessor method 90. The 3:5 vertical stretch transformation is performed at step 114 of block transfer 110 to determine which scan line of source bitmap 130 maps to each scan line of destination bitmap 132. Such non-integer stretch transformations are more complex to process than the processing of integer stretch transformations described above.

In the preferred embodiment, non-integer stretch transformations are processed using a digital differential analysis ("DDA") method. The well-known Bresenham scan conversion method is a DDA method which is utilized in drawing a line segment on a bitmap to determine which pixels are in the line. In the preferred embodiment, a modified DDA method is utilized in determining which elements of a source scan line are to be mapped to elements of a destination scan line according to a stretch transformation. According to the DDA method utilized in the preferred embodiment, the element of a source scan line which is mapped to each element of a destination scan line is determined incrementally based on the source element mapped to the immediately preceding destination element. Generally, the leftmost element of a source scan line is mapped to the leftmost element of a destination scan line. In exemplary block transfer 128 for example, the leftmost pixel $S_{0,0}$ of source scan line $S_{0,0}$–$S_{0,3}$ maps to the pixel $D_{0,0}$ of destination scan line $D_{0,0}$–$D_{0,9}$. In other words, the pixel at an offset of zero in a scan line of source bitmap 130 is mapped to the pixel at an offset of zero in a scan line of destination bitmap 132. This initial offset becomes the initial value of an error term which is used in incrementally determining the offset of source pixels which map to successive pixels in a scan line of destination bitmap 132.

The error term for each successive destination pixel is then determined by the following formula based on the error term for the preceding destination element:

$$E_{i+1} = E_i + \frac{\Delta S}{\Delta D} \tag{2}$$

where $E_i$ is the error term for the i-th destination element, and $$\frac{\Delta S}{\Delta D}$$

is the incremental change per element of the destination scan line (e.g. ⅖ for the 2:5 stretch transformation in block transfer 128). The value of $E_i$ is rounded to the next lower whole number to yield the offset of the pixel in a source scan line which maps to the destination pixel. In block transfer 128 for example, the error term for each successive pixel of a destination scan line is determined by adding ⅖ to the error term for the previous pixel of the destination scan line. This error term is then rounded to the next lower whole number to yield the offset of the source pixel which maps to the respective destination pixel. Accordingly, to get the offset of the source pixel which maps to the second destination pixel, ⅖ is added to zero (the error term of the first destination pixel) then rounded to zero (which is the next lower whole number). To yield the offset of the source pixel which maps the third destination pixel, ⅖ is added to ⅖ (the error term of the second destination pixel) to equal ⅘ which also rounds to zero (the next lower whole number to ⅘). In performing preprocessor method 90 for block transfer 128, these offsets are stored in consecutive entries ($A_0$–$A_9$) of mapping array 138. Incrementally accumulating ⅖ with the error term for each of the remaining pixels of a destination scan line yields error term values of 6/5, 8/5, 2, 12/5, 14/5, 16/5, and 18/5. These error terms are rounded to 1, 1, 2, 2, 2, 3, and 3, respectively, to obtain the indices which are stored into mapping array 138.

The 3:5 vertical stretch transformation is processed in a like manner at step 114 of method 110 to determine which source scan lines are mapped to scan lines of destination bitmap 132.

Figure 7:
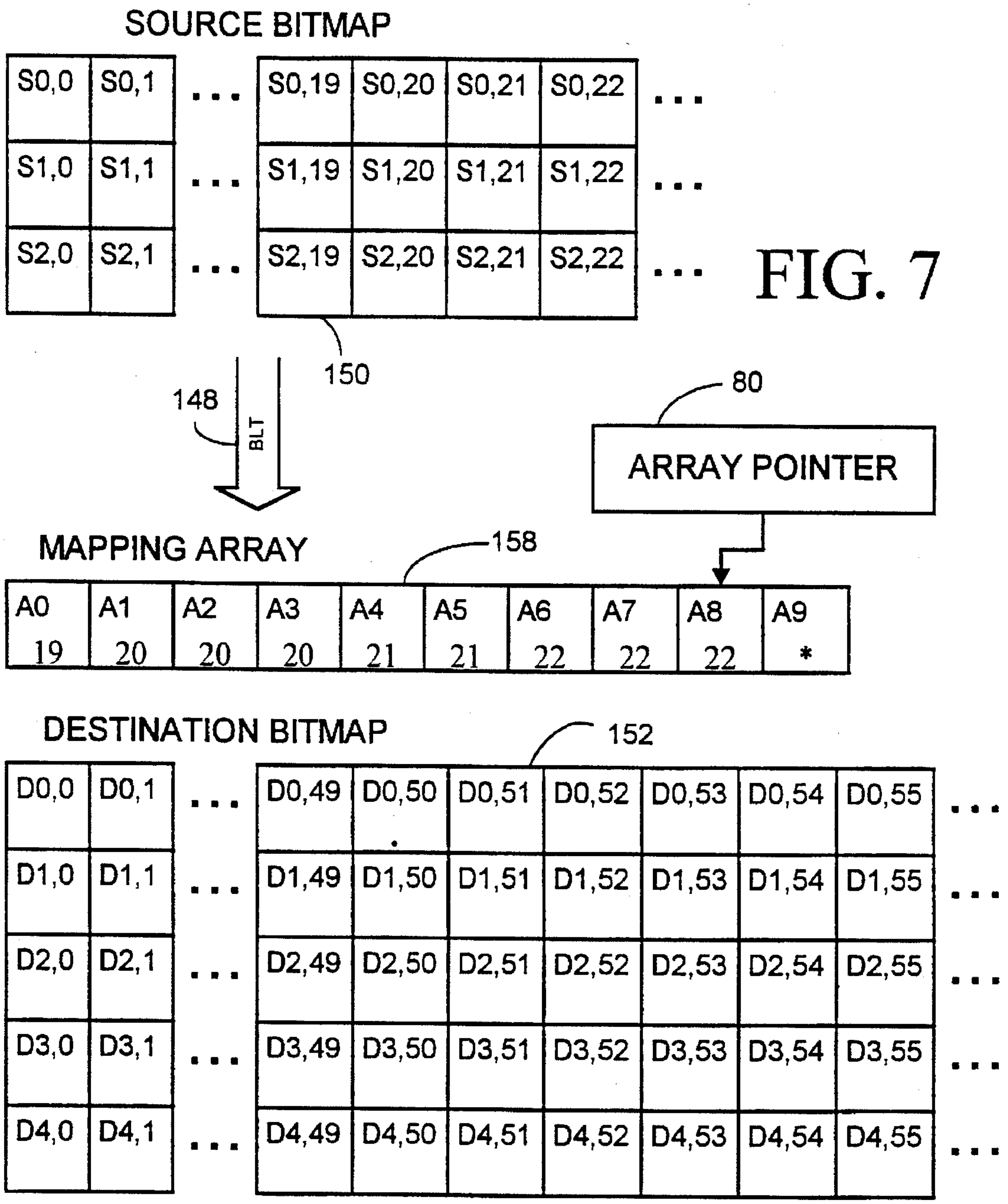
FIG. 7 is a diagram illustrating a block transfer including a stretch transformation with clipping from a source bitmap to a destination bitmap using the methods shown in FIGS. 4 and 5.

FIG. 7 shows an exemplary block transfer 148 involving a non-integer stretch transformation with clipping. In block transfer 148, pixels from a source bitmap 150 are transferred to a "transfer" portion ($D_{0,49}$ et seq.) of a destination bitmap 152 to avoid overwriting image data in a "clipped" portion ($D_{0,0}$–$D_{0,48}$) of destination bitmap 152. Such block transfers with clipping are particularly useful in graphical user interfaces employing overlapping windows. Destination bitmap 152, for example, may be a "window" area of a display buffer where source bitmap 150 is to be displayed. However, if another window overlaps the clipped portion of destination bitmap 152, pixels of source bitmap 150 should be transferred to only the non-overlapped transfer portion of destination bitmap 152 to avoid overwriting image data in the other window. The pixels of source bitmap 150 which map to the clipped portion are simply not transferred.

In block transfer 148, a 2:5 horizontal stretch transformation is applied in mapping elements of source bitmap 150 to destination bitmap 152. To process the transformation when forming a mapping array 158 for block transfer 148 (at step 94 of preprocessor method 90 in FIG. 4), the DDA method described above is used. However, to avoid having to perform the incremental determination (according to equation (2) above) for those elements of a destination scan line falling within the clipped portion, the DDA method preferably begins by determining the error term of the leftmost pixel of a scan line in the transfer portion of destination bitmap 152. In the preferred embodiment this error term is determined according to the following equation:

$$E_i = i \times \frac{\Delta S}{\Delta D} \tag{3}$$

where $E_i$ is the error term of the leftmost pixel in the transfer portion of a scan line of the destination bitmap and i is the offset of that pixel in the scan line. In block transfer 148 for example, the leftmost pixel in the transfer portion of a destination scan line is at an offset of 49, and the stretch ratio is 2:5. According to equation (3) above, the error term for this pixel is therefore $19\frac{3}{5}$. To yield the offset of the pixel in a source scan line which maps to this destination pixel, this error term is rounded to the next lower whole number or 19. Preprocessor 60 stores this offset in the first entry $A_0$ of mapping array 158. The remaining entries of the mapping array 158 can then be determined by applying the incremental determination of the DDA method to the remaining pixels in the transfer portion of the destination scan line as described above.

Figure 8:
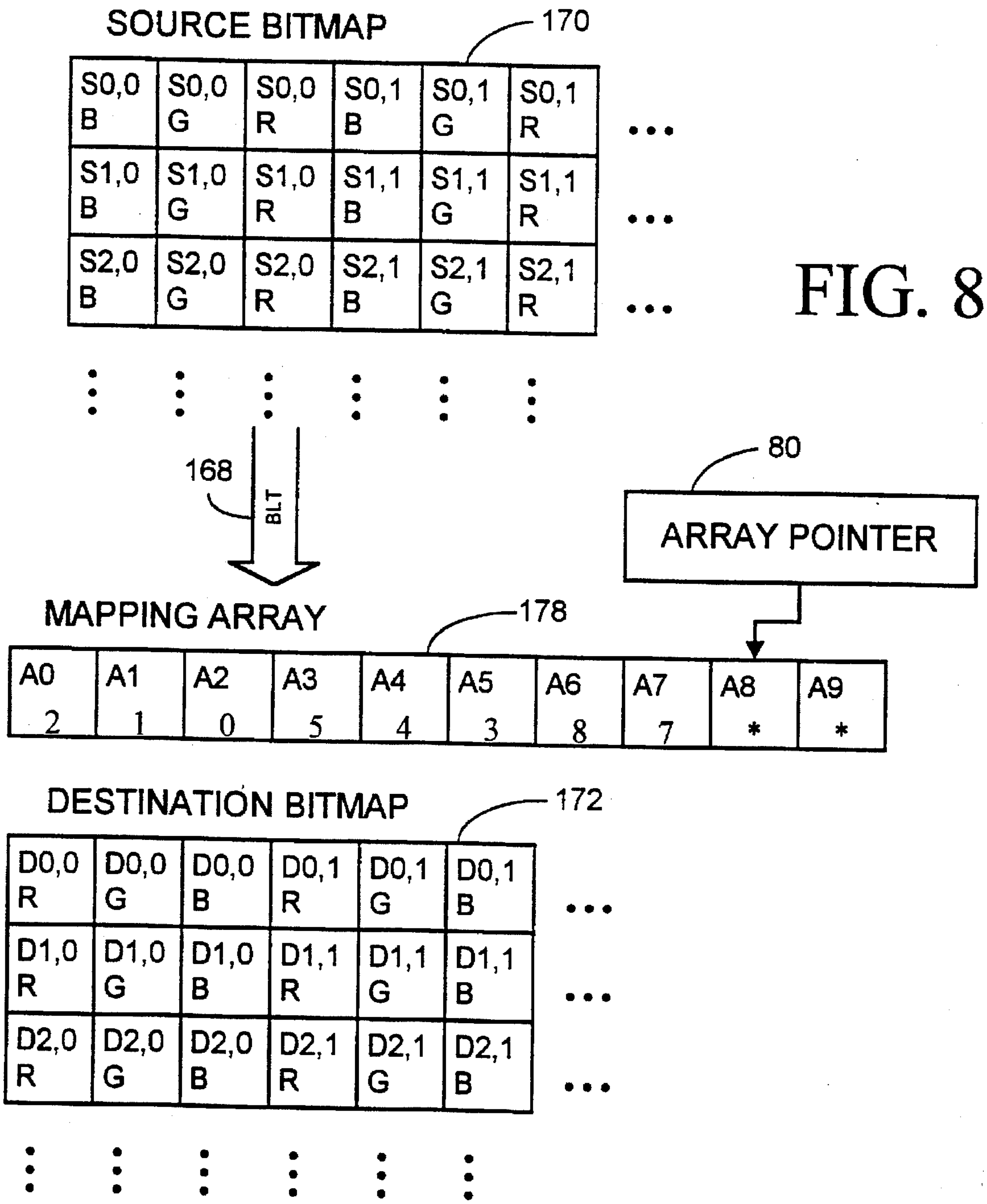
FIG. 8 is a diagram illustrating a block transfer from a source bitmap to a destination bitmap including a color model conversion using the methods shown in FIGS. 4 and 5.

FIG. 8 shows an exemplary block transfer 168 involving a color conversion between a source bitmap 170 and a destination bitmap 172. In source bitmap 170, each pixel (e.g. $S_{0,0}$, $S_{0,1}$, etc. . .) is represented with three color components, blue, green and red (e.g. $S_{0,0B}$, $S_{0,0G}$ and $S_{0,0R}$), in that order. In destination bitmap 172, however, the color of each pixel is represented by color components in the order red, green, and then blue (e.g. $D_{0,0R}$, $D_{0,0G}$ and $D_{0,0B}$). Accordingly, to properly transfer pixels of source bitmap 170 to destination bitmap 172, the color components of each pixel are re-ordered with use of a mapping array 178 by processes 90, 110 described above. This type of color conversion is most easily accomplished when each color component of a pixel is separately addressable, such as for 24-bit per pixel bitmaps where each color component is a separately addressable byte of data.

In block transfer 168, the elements of source bitmap 170 that are mapped to destination bitmap 172 are the color components of the pixels rather than the pixels themselves. Accordingly, the entries $A_0$–$A_9$ of mapping array 178 correspond one-to-one to the color components $D_{0,0R}$, $D_{0,0G}$, etc. . . of a scan line of destination bitmap 172. Mapping array 178 is then filled by process 90 with indices to color components within a source scan line. An incremental determination similar to the DDA method described above for non-integer stretch transformation also can be used to determine the indices of the source color components which map to destination color components. For example, an index of two for the source color component which maps to the leftmost color component of a destination scan line is stored in the first entry $A_0$ of mapping array 178. The index for the next entry $A_1$ is determined by subtracting one from the index in the immediately preceding entry $A_0$. This yields an index of 1 to store in array entry $A_1$. For the next entry $A_2$, the index is determined by again subtracting one from the index in the immediately preceding entry $A_1$, yielding an index of 0. For the next entry $A_3$, the index is determined by adding 5 to the index of the immediately preceding entry $A_2$, yielding an index of 5. The steps of subtracting one twice and adding five can then be repeated for each successive group of three entries. Other alternative methods also can be used. For example, the entries can first be filled with numbers 0, 1, 2, etc. . . . Then the index in every third entry starting with $A_2$ is switched with the index that is stored two entries back (i.e. the indices of entries $A_2$, $A_0$ are switched, the indices of entries $A_5$ and $A_3$ are switched etc. . .) to yield the desired sequence of indices 2, 1, 0, 5, 4, 3, etc. . . .

Having illustrated and described the principles of the invention in a preferred embodiment, it should be apparent to those skilled in the art that the embodiment can be modified in arrangement and detail without departing from such principles. For example, elements of the preferred embodiment shown in software may be implemented in hardware and vice versa. In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A method of block transfer image conversion, comprising:

storing a bitmap of a source image in an addressable memory, the bitmap having a plurality of scan lines, each scan line having a plurality of elements;

forming an array of indices to elements of the source image bitmap which correspond to a plurality of elements in a first scan line of a destination image bitmap; and for each of a plurality of scan lines of the destination image bitmap, copying a plurality of elements of that scan line of the destination image bitmap from elements in a corresponding scan line of the source image bitmap at the indices of the array.

2. The method of claim 1 wherein the indices of the array are to a plurality of pixels of the source image bitmap which correspond to a plurality of pixels in the first scan line of the destination image bitmap according to a stretch transformation.

3. The method of claim 1 wherein the indices of the array are to a plurality of pixels of the source image bitmap which correspond to a plurality of pixels in the first scan line of the destination image bitmap according to a clipping transformation.

4. The method of claim 1 wherein the indices of the array are to a plurality of pixels of the source image bitmap which correspond to a plurality of pixels in the first scan line of the destination image bitmap according to a stretch transformation with clipping.

5. The method of claim 1 wherein the indices of the array are to a plurality of color elements of the source image bitmap which correspond to a plurality of color elements in a first scan line according to a color model conversion.

6. The method of claim 1 wherein the step of forming the array of indices comprises for each of the elements in the first scan line of the destination image bitmap:

determining which element of the source image bitmap corresponds to the respective destination image bitmap element according to an image conversion; and storing an index to the corresponding source image bitmap element at an entry of the array associated with the respective destination image bitmap element.

7. The method of claim 6 wherein the elements of the source bitmap image and the elements of the first scan line of the destination image bitmap correspond according to a stretch ratio.

8. The method of claim 6 comprising:

performing a digital differential analysis conversion to determine which element of the source image bitmap corresponds to the respective destination image bitmap element.

9. The method of claim 6 comprising:

performing a digital differential analysis conversion with clipping to determine which element of the source image bitmap corresponds to the respective destination image bitmap element.

10. The method of claim 6 comprising:

performing a conversion imposing a different ordering of color components to determine which color component of the source image bitmap corresponds to the respective destination image bitmap color component.

11. A computer-readable medium for storing a computer program comprising instructions for executing the method of claim 1.

12. A computer system in accordance with the method of claim 1.

13. A method of block transfer image conversion, comprising:

storing a bitmap of a source image in an addressable memory, the bitmap having a plurality of scan lines, each scan line having a plurality of elements;

forming a destination image bitmap having a plurality of scan lines, each scan line having a plurality of elements;

determining an order for copying a plurality of elements of a scan line of the source image bitmap to consecutive elements of a corresponding scan line of the destination image bitmap according to a desired image conversion;

forming an array having a plurality of array elements;

storing indices to the plural source image scan line elements according to the order into sequential array elements; and for each of a plurality of scan lines of the destination image bitmap, copying the elements from a corresponding scan line of the source image bitmap at the indices stored in the array elements in sequence into consecutive elements of the respective destination image bitmap scan line.

14. The method of claim 13 comprising:

providing a source element pointer to indicate a first pixel of a representative source image bitmap scan line;

determining a ratio equal to a number of pixels per source image bitmap scan line to a number of pixels per destination image scan line;

initializing an error term;

repeating for each of a plurality of the array elements in sequence:

rounding the error term to a whole number to yield an index to a source pixel;

storing the index into the array element indicated by the array element pointer;

accumulating the error term plus the ratio; and advancing the array element pointer by one array element.

15. The method of claim 14 comprising:

determining an index of a first of consecutive pixels in the representative destination image bitmap scan line to be copied from the source image bitmap;

multiplying the index of the first of the consecutive pixels by the ratio to form a product; and initializing the error term to the product.

16. A bitmap block transfer processor for image conversion, comprising:

a source image memory having a source image bitmap stored therein, the source image bitmap having a plurality of scan lines, each scan line having a plurality of elements;

a destination image memory for storing a destination image bitmap, the destination image bitmap having a plurality of scan lines, each scan line having a plurality of elements;

an array memory for storing an array having a plurality of array elements;

a graphics engine having access to the memories, the engine determining an order in which to copy a plurality of elements of a scan line of the source image bitmap to a plurality of consecutive elements of a scan line of the destination image bitmap, and storing indices to the plural source image scan line elements into sequential array elements according to the order;

the engine, for each of a plurality of scan lines of the destination image bitmap, copying the elements from a corresponding scan line of the source image bitmap at the indices stored in the array elements in sequence into consecutive elements of the respective destination image bitmap scan line;

a display driver in communication with the graphics engine for forming a visually perceptible image using the destination image bitmap.

* * * * *